US010046691B2

(12) United States Patent
Petru

(10) Patent No.: US 10,046,691 B2
(45) Date of Patent: Aug. 14, 2018

(54) VERTICALLY ADJUSTABLE AND REMOVABLE HEADACHE RACK SYSTEM

(71) Applicant: Trailboss Equipment, LLC, Shiner, TX (US)

(72) Inventor: Jonathan Petru, Victoria, TX (US)

(73) Assignee: TRAILBOSS EQUIPMENT, LLC, Shiner, TX (US)

( * ) Notice: Subject to any disclaimer, the term of this patent is extended or adjusted under 35 U.S.C. 154(b) by 0 days.

(21) Appl. No.: 15/655,337

(22) Filed: Jul. 20, 2017

(65) Prior Publication Data

US 2017/0313234 A1    Nov. 2, 2017

Related U.S. Application Data

(63) Continuation of application No. 15/148,729, filed on May 6, 2016, now Pat. No. 9,713,978.

(60) Provisional application No. 62/157,796, filed on May 6, 2015.

(51) Int. Cl.
| | | |
|---|---|---|
| *B60P 7/135* | (2006.01) | |
| *B60P 1/00* | (2006.01) | |
| *B60R 9/045* | (2006.01) | |

(52) U.S. Cl.
CPC ............. *B60P 7/135* (2013.01); *B60P 1/00* (2013.01); *B60R 9/045* (2013.01)

(58) Field of Classification Search
CPC ............ B60P 1/00; B60P 7/135; B60R 9/045
USPC ............................................................ 296/3
See application file for complete search history.

(56) References Cited

U.S. PATENT DOCUMENTS

| | | | |
|---|---|---|---|
| 4,661,824 A * | 4/1987 | Kuge | B41J 2/32 346/105 |
| 4,732,420 A | 3/1988 | O'Neil et al. | |
| 4,953,908 A | 9/1990 | Dondlinger | |
| 6,746,047 B2 * | 6/2004 | Hagen | B60R 21/02 280/748 |
| 6,983,968 B2 | 1/2006 | Brauer et al. | |
| 8,668,124 B2 * | 3/2014 | Kennedy | B60R 21/026 224/402 |
| 9,132,784 B2 * | 9/2015 | Harrison | B60R 9/045 |
| 2003/0011180 A1 * | 1/2003 | Coffman | B60R 11/00 280/748 |
| 2011/0108590 A1 | 5/2011 | Kennedy | |

(Continued)

*Primary Examiner* — Pinel E Romain
(74) *Attorney, Agent, or Firm* — Jackson Walker L.L.P.

(57) ABSTRACT

A headache rack system for a truck includes a truck bed and a removable and vertically adjustable headache rack. The truck bed is adapted to be attached to a truck frame and includes a floor and a side panel connected to the floor. The side panel includes a first flange and a second flange. The removable headache rack includes a first side support, a second side support, a top support connected to an upper end of the first side support and an upper end of the second side support, and a panel connected to a lower end of the first side support and a lower end of the second side support. The first and second flanges, respectively, may extend beyond a leading edge of the floor and wrap around a portion of the front of the truck bed to define a slot configured for receiving the lower ends of the first and second side supports. The side supports are adapted to be received within the slot and selectively coupled to the truck bed at one of a first height and a second height in relation to a cab of a truck to which the truck bed is attached.

19 Claims, 7 Drawing Sheets

(56) References Cited

U.S. PATENT DOCUMENTS

2015/0273987 A1   10/2015   O'Leary

* cited by examiner

VERTICALLY ADJUSTABLE AND REMOVABLE HEADACHE RACK SYSTEM

CROSS REFERENCE TO RELATED APPLICATIONS

This application is a continuation of U.S. Nonprovisional patent application Ser. No. 15/148,729, filed on May 6, 2016, entitled "VERTICALLY ADJUSTABLE AND REMOVABLE HEADACHE RACK SYSTEM", which claims priority from U.S. Provisional Patent Application No. 62/157,796, filed May 6, 2015, entitled "VERTICALLY ADJUSTABLE HEADACHE RACK SYSTEM", both of which are incorporated by reference herein.

BACKGROUND

Field of the Disclosure

The present disclosure relates to the field of truck racks and, more particularly, a headache rack for mounting to a truck bed.

Description of the Related Art

Front bulkheads, typically referred to as headache racks, are mounted behind the passenger cab of a truck and forward of the truck's bed and serve to protect the truck's cab and cab occupants from forwardly shifting loads. These headache racks may also be used to support and secure loads being carried in or on the bed of the truck. The height of a truck's cab above the bed varies among manufacturers and truck models.

DETAILED DESCRIPTION

Figure 1A:
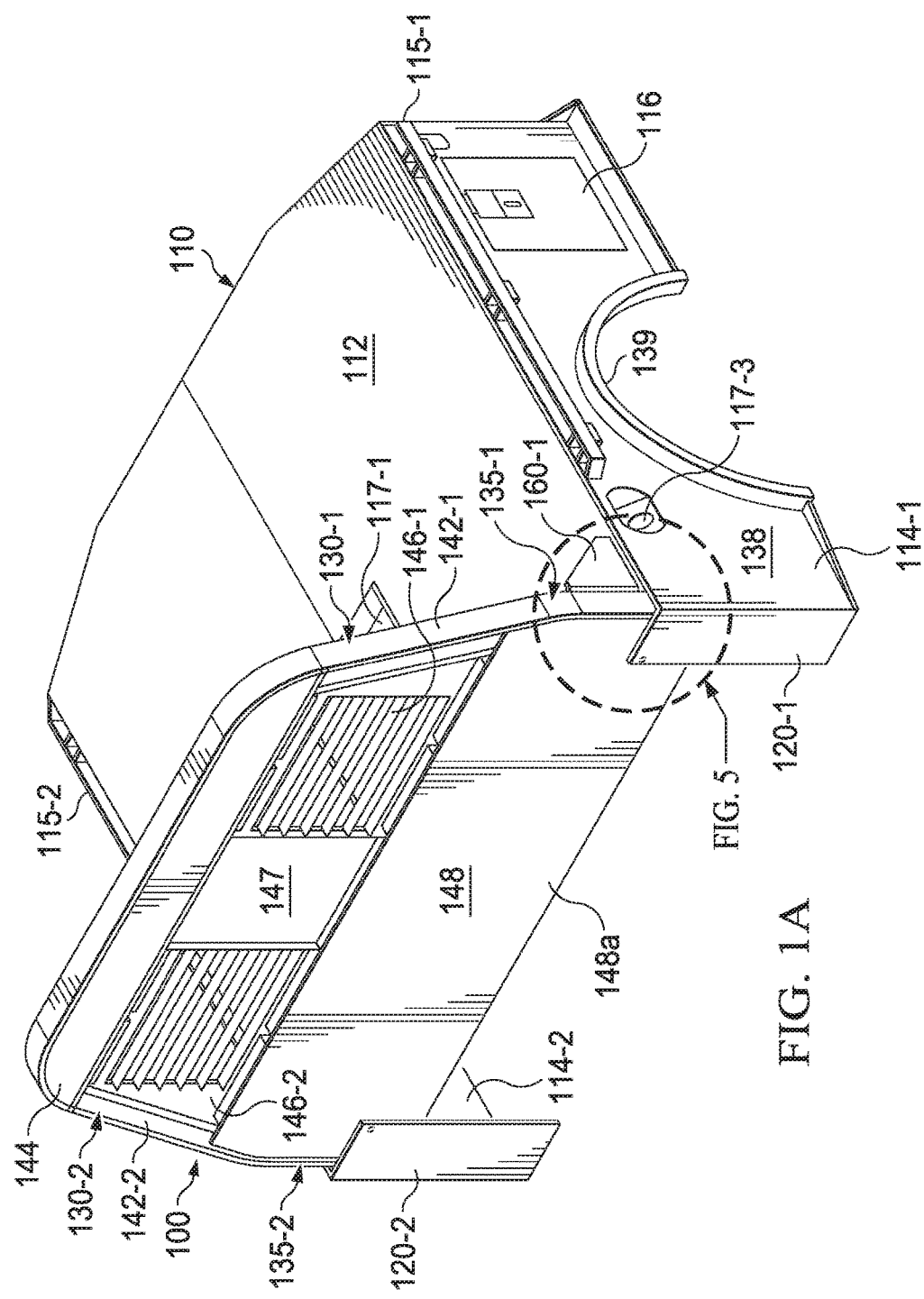
FIG. 1A is an isometric view of an example vertically adjustable and removable headache rack integrated with a truck bed.

In the following description, details are set forth by way of example to facilitate discussion of the disclosed subject matter. It should be apparent to a person of ordinary skill in the field, however, that disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, widget 12-1 refers to an instance of a widget class, which may be referred to collectively as widgets 12 and any one of which may be referred to generically as a widget 12.

Disclosed subject matter describes a removable headache rack, a modular truck bed floor, and a headache rack system that includes the modular truck bed and the removable headache rack as its primary components. The truck bed includes a floor having a forward edge that is proximal to a cab of the truck when the truck bed is properly positioned on a truck chassis. The truck bed may include side panels connected to opposing lateral edges of the floor. The forward portion of a side panel may extend beyond the forward edge of the floor and may terminate at a side panel flange. The side panel flange may be oriented at right angles, or nearly so, with respect to the corresponding side panel. In some embodiments, the side panel flange may remain parallel with respect to the corresponding side panel. The side panel flange may be displaced forward of the forward edge by a displacement referred to herein as a slot displacement. The pair of side panel flanges, together with the forward edge of the truck bed, may define the outline of a slot region into which the removable headache rack or another suitably configured implement may be movably inserted.

The headache rack may include first and second side supports and a top support connected between upper ends of the two side supports. The headache rack may include a rack panel connected between lower portions of the first and second side supports. In some embodiments, upper portions of the headache rack may include louvres, a window or other opening, or a combination of both. In other embodiments, the rack panel may extend to the upper portions of the top support. In further embodiments, the top support and the two side supports may be configured in such a manner that the two side supports extend beyond the top support to define a region suitable for supporting materials wherein the materials may be supported from underneath by the top support and may be prevented from laterally sliding off the top support by the two side supports.

Each side support may include a rearward face in which a plurality of support apertures are located and each side support may be adapted to be received within the slot region. When received in the slot, the headache rack may be coupled to the truck bed via any of a plurality of combinations of the support apertures. Each particular combination of support aperture combinations may correspond to a different rack height, i.e., a vertical displacement between the truck bed floor and the top support when the headache rack is inserted in the slot and affixed to the truck bed.

Lower ends of each side support may extend below the floor of the truck bed when the headache rack is coupled to the truck bed via any of the plurality of support aperture combinations. The rack panel may also be configured wherein a lower portion of the rack panel extends below the floor when the rack panel is connected to the first and second side supports.

The truck bed may include brackets affixed to the floor near the forward edge. The brackets may include a plurality of apertures configured to align to the selected combination of support apertures. The brackets may be implemented as L-brackets that include a first leg affixed to the floor and a second leg affixed to a rearward oriented face of the respective side support and where the second leg contains a plurality of apertures that align to the support apertures.

Figure 1B:
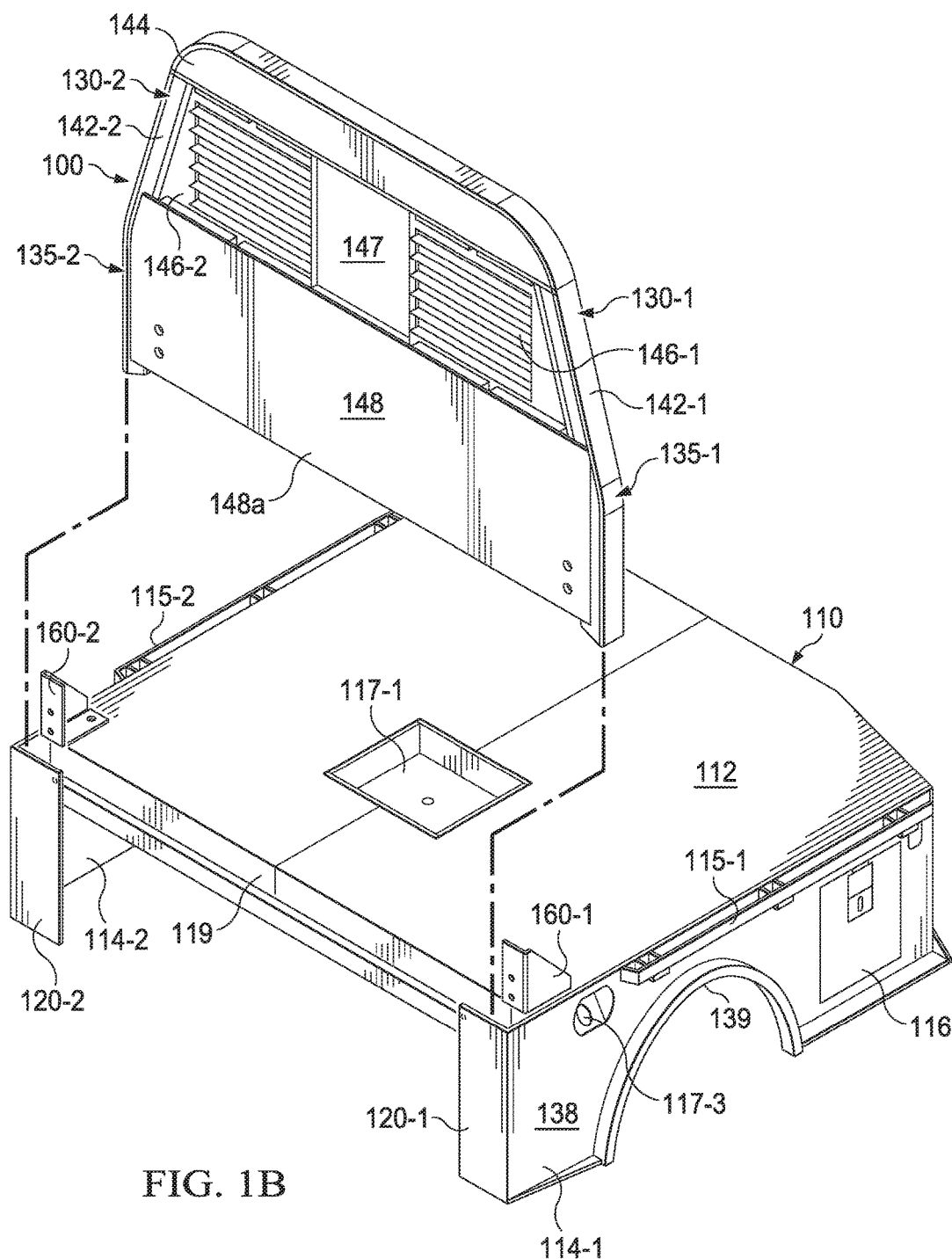
FIG. 1B is an isometric exploded view of the truck bed and the adjustable and removable headache rack of FIG. 1A.
Figure 2:
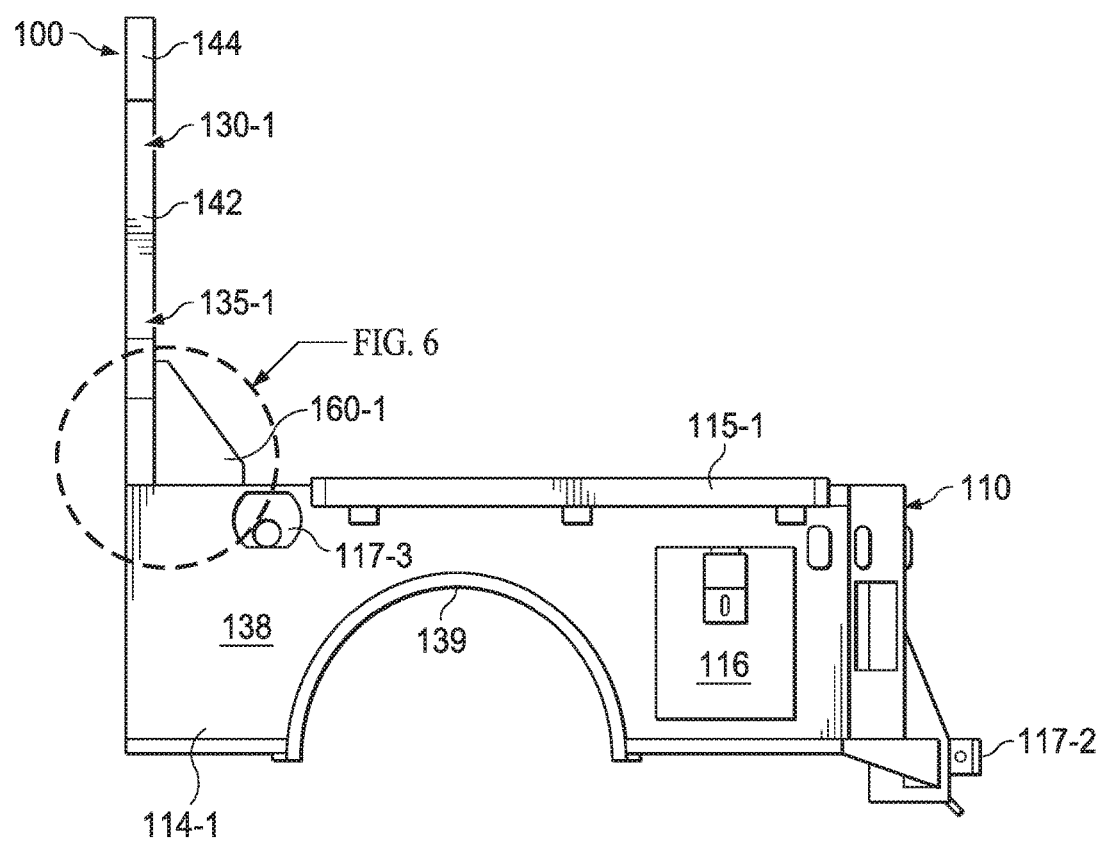
FIG. 2 is a side view of the adjustable and removable headache rack of FIG. 1A integrated with a truck bed.
Figure 3:
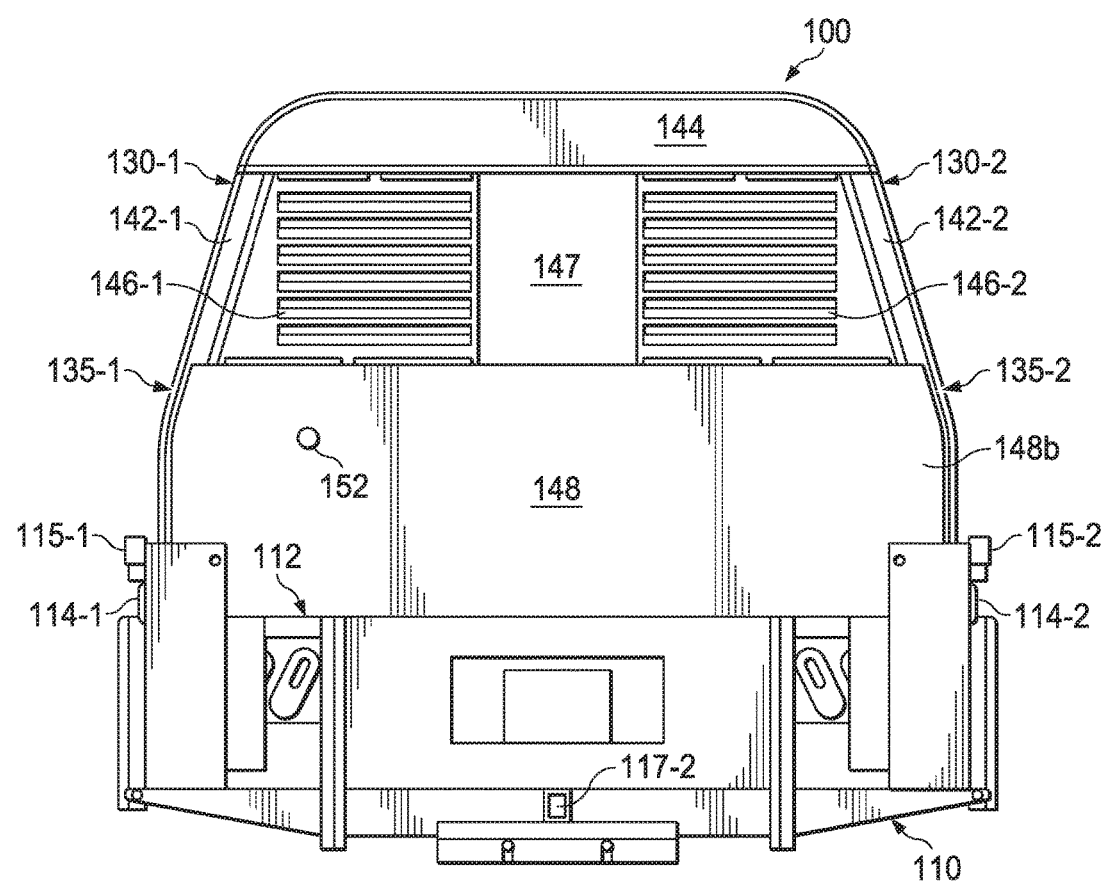
FIG. 3 is a rear view of the adjustable and removable headache rack of FIG. 1A integrated with a truck bed.
Figure 4:
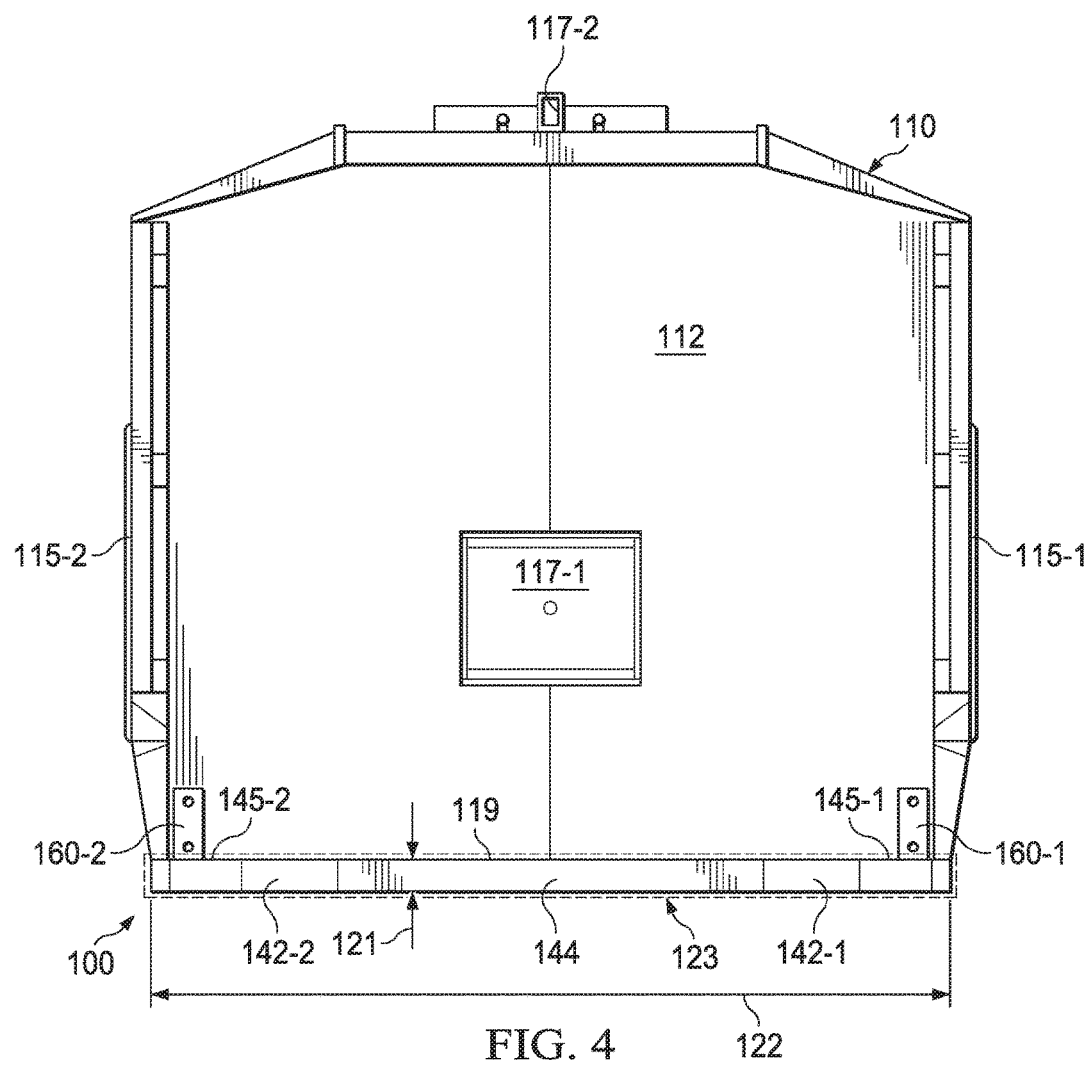
FIG. 4 is a top view of the adjustable and removable headache rack of FIG. 1A integrated with a truck bed.
Figure 5:
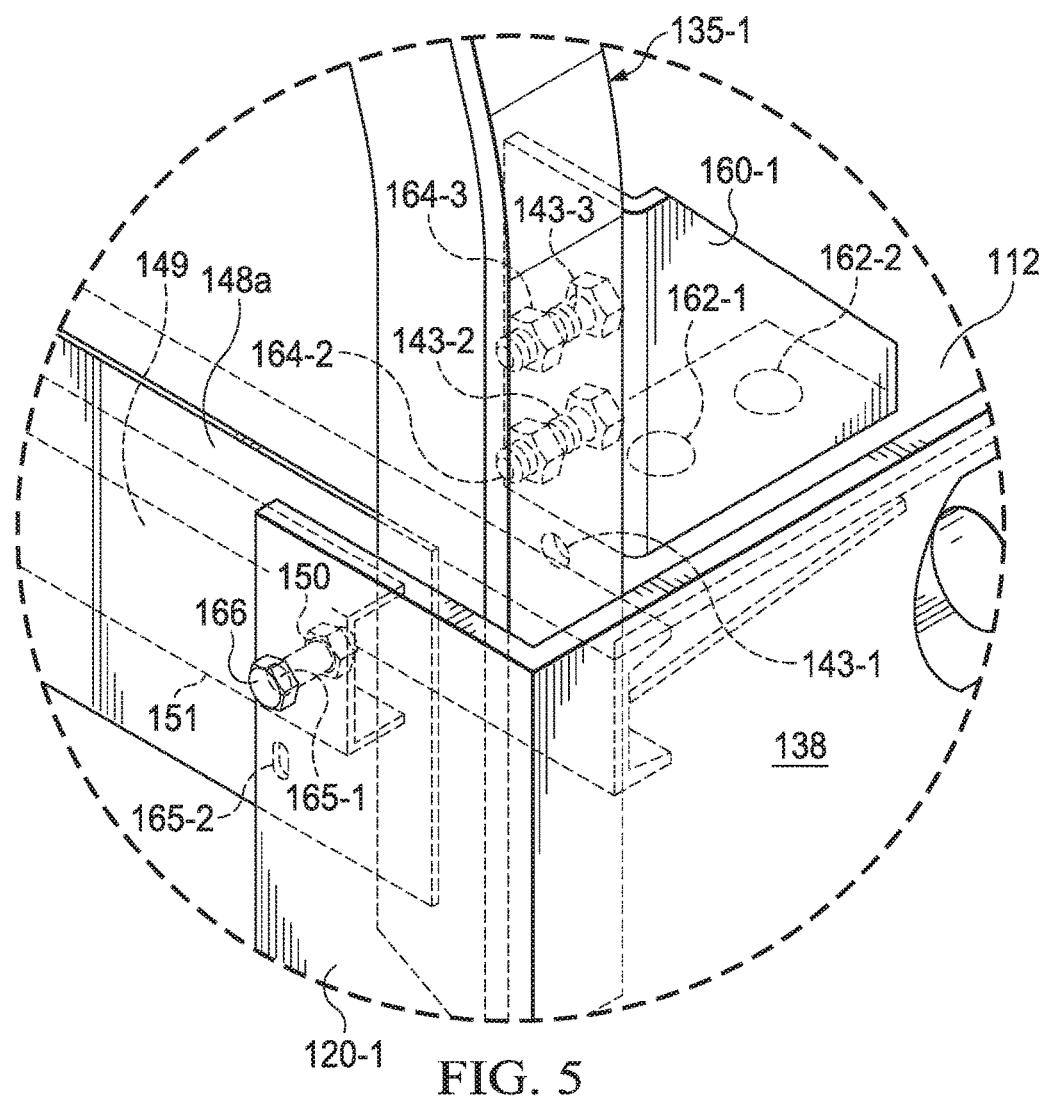
FIG. 5 is an isometric view of the engagement between a truck bed and the adjustable and removable headache rack of FIG. 1A.
Figure 6:
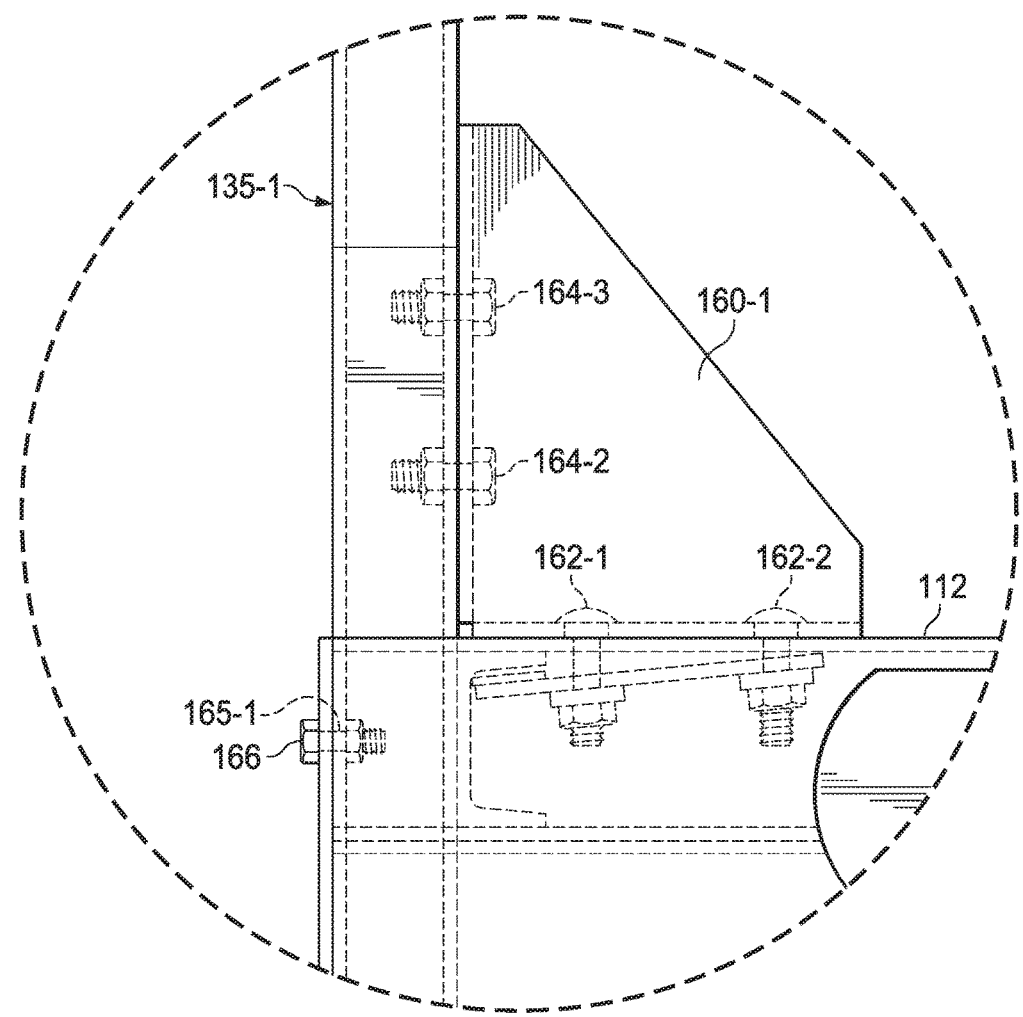
FIG. 6 is a further isometric view of the engagement between a truck bed and the adjustable and removable headache rack of FIG. 1A.

FIG. 1A illustrates a removable headache rack 100 and a truck bed 110 in isometric view. FIG. 1B illustrates removable headache rack 100 and a truck bed 110 in exploded isometric view. FIG. 2 illustrates headache rack 100 and truck bed 110 in side elevation view. FIG. 3 illustrates headache rack 100 and truck bed 110 in rear view. FIG. 4 illustrates headache rack 100 and truck bed 110 in top view. FIGS. 5 and 6 illustrate the engagement of headache rack 100 and truck bed 110 in isometric view.

The truck bed 110 illustrated in FIGS. 1A, 1B, and 2 through 6 includes a floor 112, which is substantially flat, and side panels 114 connected to or otherwise integrated with floor 112 and extending along lateral edges of floor 112. Truck bed 110 may include any number of accessories (e.g., rails 115, storage compartments 116, etc.) and ports (e.g., trailer hitch ports 117-1 and 117-2, fuel filler port 117-3, etc.). Headache rack 100 and truck bed 110 may have a variety of shapes and sizes and are each generally constructed of steel, but may also be made of iron, aluminum, carbon fiber, and/or any other appropriate materials. In at least one embodiment, headache rack 100 may include any number of accessories, including accessories such as lights, rails, hooks, and storage compartments or lockers. Truck bed 110 is sized and configured for coupling to the frames of one or more trucks. As discussed in more detail below, headache rack 100 is removable and sized and configured for coupling to truck bed 110 in a manner that permits selection of headache rack 100 from any of a number shapes and sizes and selective vertical adjustment of headache rack 100 in relation to a cab of a truck for which truck truck bed 110 is mounted.

As illustrated in FIGS. 1A and 1B, headache rack 100 includes a rack panel 148, side supports 142, a top support 144, an opening 147, and inserts 146. In some embodiments, supports 142 and 144 may also be rails. Top support 144 may be welded to a first end 130 of each of side supports 142, and rack panel 148 may be welded to a lower portion of a second end 135 of each of side supports 142 so as to define opening 147. The illustrated opening 147 is configured to permit cab occupants to view truck bed 110 through a rear window of the truck's cab. As illustrated in FIGS. 1A and 1B, inserts 146 are mounted between side supports 142, top support 144, and rack panel 148. Inserts 146 may be welded in place between rack panel 148 and top support 144 and are designed to protect the rear window of a truck and may have a variety of different shapes and designs. As illustrated in FIGS. 1 A and 1B, inserts 146 consist of louvers. While not depicted in FIGS. 1 A and 1B, it will be appreciated that in some embodiments of headache rack 100, inserts 146 may be omitted, in other embodiments, inserts 146 may extend across the entirety of opening 147 or be integrated as part of rack panel 148, and in other embodiments, opening 147 may not be included such that rack panel 148 extends to top support 144. In further embodiments, top support 144 may be welded to an upper portion of each of side supports 142 such that each of side supports 142 extend beyond top support 144 to define a region suitable for supporting materials wherein the materials may be supported from underneath by top support 144 and may be prevented from laterally sliding off top support 144 by each of side supports 142.

The side panels 114 illustrated in FIGS. 1A, 1B, and 5 include optional side skirts 138 that extend along the sides of truck bed 110 and downwardly below the floor height, i.e., the height of floor 112, to a clearance height, where the clearance height may refer to the approximate height of a bottom of a door of the truck, typically, but not necessarily at a height in the range of approximately 12 to 24 inches above the road surface. As illustrated in FIGS. 1A and 1B, the side skirt 138 defines a wheel well opening 139 to accommodate the truck's wheels. In further embodiments, optional side skirts 130 may extend along the sides of truck bed 110 and upwardly above the floor height, i.e., the height of floor 112.

The depicted side panels 114 extend beyond leading edge 119 of floor 112 by a slot displacement 121 and include side panel flanges 120 that extend inwardly, i.e., towards the opposing lateral edge of floor 112, substantially at a right angle to the side skirts 138. Side panels 114 and side panel flanges 120 may be separate pieces that are connected or otherwise affixed to one another or they may constitute different portions of a single integrated element. Accordingly, the pair of side panel flanges 120 extend towards each other and are forwardly displaced from the leading edge 119 of floor 112 by the slot displacement 121 to cooperatively define a slot 123, having a width 122 approximately equal to a width of floor 112 and a length approximately equal to the slot displacement 121, suitably configured for receiving lower ends of side supports 142 and rack panel 148 of headache rack 100. In an alternative embodiment (not depicted), side panels 114 may omit side skirts 138, in which case lower edges of side panels 114, including side panel flanges 120, may be at the same height as floor 112 or at a height a few inches below floor 112, for example, less than approximately 18 inches in some embodiments, less than approximately 12 inches in some embodiments, and so forth. In such an alternative embodiment, floor 112 and side panels 114 may be integrated as one component. In further embodiments, side panel flanges 120 may remain substantially parallel to side panels 114, i.e., do not extend towards the opposing lateral edge of floor 112, and may still with leading edge 119 define slot 123.

The illustrated brackets 160 couple headache rack 100 to truck bed 110. In at least one embodiment, brackets 160 are "L" shaped and one leg of each bracket 160 lays substantially flush with floor 112 coupled to truck bed 110 at either end of leading edge 119 of truck bed 110 by fasteners 162. The other leg of each bracket 160 is configured to lay substantially flush to a rearward oriented face 145 (see FIG. 4) of adjacent side supports 142 and may be coupled thereto, as described in more detail below, by fasteners 164 such that bracket 160-1 is coupled to side support 142-1 and bracket 160-2 is coupled to side support 142-2. In a preferred embodiment, fasteners 162 and 164 are bolts, nuts, and washers. It will be appreciated, however, that fasteners 162 and 164 may be any suitable connecting devices used for this purpose, including latches and rivets. More generally, it will be appreciated, that any two or more elements described as being welded together may be connected to one another by way of any suitable connecting means or devices.

Each of the illustrated side supports 142 includes three support apertures 143-1, 143-2, and 143-3 adapted to receive fasteners 164. In at least one embodiment, a subset of the support apertures 143 is used to connect side support 142 to bracket 160. In the illustrated embodiment, when assembled, only two of support apertures 143 are used to connect side support 142 to bracket 160. The support apertures 143 that are used may be selected in accordance with a desired height of headache rack 100 relative to truck bed 110. Thus, by selecting to use top two support apertures 143-3 and 143-2, headache rack 100 may be mounted to truck bed 110 at a first height, and by selecting to use bottom two support apertures 143-2 and 143-1, headache rack 100 may be mounted to truck bed 110 at a second, elevated height. In a preferred embodiment, a lower end of each side support 142 remains below floor 112 of truck bed 110 regardless of which configuration of support apertures 143 is used to mount headache rack 100 to truck bed 110. In other embodiments, side supports 142 may include a larger number of support apertures 143 than depicted, which may allow for more height options, a more secure mounting of headache rack 100 to truck bed 110, or both.

In certain embodiments, a lower portion of side supports 142 may be hollow. Thus, when fasteners 164 are bolts, nuts may be inserted into side support 142 from below and mated with fasteners 164 extending through brackets 160 and entering into side supports 142. In at least one embodiment, the nuts and/or washers for use with a side support 142 may be pre-mounted on a plate (not depicted) or other suitable device such that both nuts and/or washers for one side support 142 may be held at the proper alignment by handling one element (i.e., the plate), which may be easier to hold and locate than a single nut and/or washer. In another embodiment, brackets 160 may be welded to truck bed 110 such that fasteners 162 are not used to couple brackets 160 to truck bed 110. In an alternative embodiment, support apertures 143 may be located on opposing sides of side support 142 and aligned with one another so as to allow a connector to pass entirely through side support 142 with one end of connector 164 being on the outside of one side of side support 142 and the other end of connector 164 being on the outside of the opposite side of side support 142.

The illustrated headache rack 100 also includes a rack panel 148 having a front surface 148a and a rear surface 148b. The rear surface 148b of rack panel 148 illustrated in FIG. 3 includes one or more mounting elements 152, which may be suitable for mounting one or more spare or otherwise useful items, including as a non-limiting example, a spare tire. In one embodiment, a lower portion of rack panel 148 includes or is welded or otherwise affixed to a rack panel flange 149 in which an aperture 150 may be located. The rack panel flange 149 illustrated in FIG. 5 comprises the intermediate face of a 3-face C-bracket 151 that is welded to or otherwise affixed to rack panel 148. The side panel flanges 120 illustrated in FIG. 5 include a plurality of apertures 165. Depending on the height of rack panel 148 relative to floor 112, one of the apertures 165 of side panel flange 120 may be aligned to aperture 150 of rack panel flange 149 and a bolt or other form of fastener 166 may to used secure the lateral ends of rack panel 148 to side panels 114, via side panel flanges 120, for greater headache rack stability. In an alternative embodiment, rack panel 148 may omit rack panel flange 149 and aperture 150 may be located on rack panel 148. Rear surface 148b of the depicted rack panel 148 is configured to be substantially adjacent to leading edge 119 of truck bed 110 when side supports 142 are coupled to truck bed 110. As shown in FIG. 5, rack panel 148 also extends below floor 112 of truck bed 110. It should be understood that the remaining side support 142-2 and side panel flange 120-2 mirror side support 142-1 and side panel flange 120-1 depicted in FIGS. 5 and 6.

Headache rack 100 is removable and when being coupled to truck bed 110 may be adjusted to any of various available heights relative to floor 112 or truck bed 110. As the number of pickup truck designs have increased over the years, the number of pickup trucks having different cab heights relative to their beds has also increased. Thus, headache rack 100 and truck bed 110 beneficially allow each model (i.e., style and configuration) of headache rack 100 to be selectively chosen and coupled to truck bed 110 such that one bed/headache rack combination may be used on different pickup truck designs. Additionally, headache rack 100 may advantageously be decoupled from truck bed 110 during shipping and thereby conserve space both during shipping and storage. Headache rack 100 may also include lights and other accessories.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A headache rack system for a truck, the system comprising:
   a truck bed including:
      a floor, including a forward edge proximal to a cab of the truck, side panels integrated with the floor and extending from opposing lateral edges of the floor, and side panel flanges integrated with the side panels; wherein each of the side panels extends beyond the forward edge of the floor and terminates at the respective side panel flange, wherein each side panel flange is oriented substantially at a right angle to the respective side panel; and
   a plurality of removable headache racks, wherein each of the plurality of removable headache racks includes:
      a first side support;
      a second side support;
      a top support connected to an upper end of the first side support and an upper end of the second side support; and
      a rack panel connected to a lower portion of the first side support and a lower portion of the second side support;
   wherein:
      the side panel flanges cooperatively define a slot configured for receiving the lower ends of the first and second side supports of each of the plurality of removable headache racks;
      each of the side supports of each of the plurality of removable headache racks:
         includes a rearward face in which a plurality of support apertures are located; and
         is adapted to be received within the slot and coupled to the truck bed via any of a plurality of support aperture combinations;
      each of the plurality of support aperture combinations corresponds to a different rack height, comprising a vertical displacement between the floor and the top support of each of the plurality of removable headache racks; and
      use of a particular support aperture combination to couple the side supports to the truck bed results in a particular rack height unique to the particular support aperture combination; and
   further wherein, the headache rack system is configured for each of the plurality of removable headache racks to be interchangeably connected to the truck bed via any of the plurality of support aperture combinations.

2. The headache rack system of claim 1, wherein, when coupled to the truck bed via any of the plurality of support aperture combinations, lower ends of each side support of at least one of the plurality of removable headache racks extend below the floor of the truck bed.

3. The headache rack system of claim 1, wherein the rack panel of at least one of the plurality of removable headache racks is configured wherein a lower portion of the rack panel extends below the floor when the rack panel is connected to the first and second side supports of the rack panel.

4. The headache rack system of claim 1, wherein each of the side supports is coupled to an L-bracket including a first leg affixed to the floor and a second leg affixed to a rearward oriented face of the respective side supports via the particular plurality of support apertures.

5. The headache rack system of claim 4, wherein each of the second leg of the L-bracket includes a plurality of flange apertures adapted to align to the particular support aperture combination.

6. The headache rack system of claim 1, wherein the top support of at least one of the plurality of removable headache racks includes a viewing opening intermediate between the first side support and the second side support and configured to permit viewing of brake lights in the cab of the truck.

7. A removable rack apparatus suitable for attaching to a vehicle bed floor at any of a plurality of rack heights, the rack apparatus comprising:
   first and second side supports; and
   a top support connected between upper ends of the first and second side supports;
   wherein:
   lower ends of the first and second side supports are sized and displaced for inserting in an opening defined by:
   a forward edge of the vehicle bed floor, and
   a pair of opposing side panels integrated within the vehicle bed floor and displaced in front of the forward edge of the vehicle bed floor by a slot displacement, wherein the slot displacement defines a length of the opening and a width of the vehicle bed floor defines a width of the opening;
   each of the first and second side supports:
   includes a rearward face in which a plurality of support apertures are located; and
   is adapted to be received within the opening coupled to the vehicle bed floor via any of a plurality of support aperture combinations;
   each of the plurality of support aperture combinations corresponds to a different rack height, comprising a vertical displacement between the vehicle bed floor and the top support; and
   use of a particular support aperture combination to couple the first and second side supports to the vehicle bed floor results in a particular rack height unique to the particular support aperture combination.

8. The rack apparatus of claim 7, wherein, when coupled to the vehicle bed floor via any of the plurality of support aperture combinations, lower ends of each of the first and second side supports extend below the vehicle bed floor.

9. The rack apparatus of claim 7, further comprising:
   a rack panel; wherein the rack panel is configured wherein a lower portion of the rack panel extends below the vehicle bed floor when the rack panel is connected to the first and second side supports.

10. The rack apparatus of claim 7, wherein each of the first and second side supports includes a rearward oriented face configured to couple to a second leg of a respective L-bracket, wherein a first leg of the L-bracket is configured to affix to the vehicle bed floor and the second leg is configured to affix to the rearward oriented face via the particular plurality of support aperture combinations.

11. The rack apparatus of claim 10, wherein each of the second legs includes a plurality of apertures adapted to align to the particular support aperture combination.

12. The rack apparatus of claim 7, further comprising:
   a rack panel connected between lower portions of the first and second side supports; and
   an insert portion between the rack panel and the top support, wherein the insert portion includes a plurality of louvers.

13. The rack apparatus of claim 12, wherein the insert portion includes a viewing opening intermediate between a first portion of the plurality of louvers and a second portion of the plurality of louvers.

14. A modular truck bed for use in providing a truck with a truck bed floor, the truck bed comprising:
   a truck bed floor including a forward edge proximal to a cab of the truck; and
   side panels integrated into opposing lateral edges of the truck bed floor, wherein each of the side panels has a first portion that extends beyond the forward edge of the truck bed floor and substantially in line with its respective lateral edge and terminates at a second portion, wherein each second portion is oriented substantially at a right angle to its respective first portion and displaced in front of the forward edge by a slot displacement, and wherein the side panels and the forward edge of the truck bed floor outline a slot region suitable for receiving side supports of a removable rack apparatus.

15. The modular truck bed of claim 14, further comprising:
   a pair of L-brackets including a first leg affixed to the truck bed floor and a second leg configured to attach to a rearward oriented face of a respective side support.

16. The modular truck bed of claim 15, wherein each of the L-bracket second legs includes a plurality of flange apertures adapted to align to a particular combination of support apertures included in the rearward oriented face of the respective side support.

17. The modular truck bed of claim 14, wherein each of the second portions of each side panel includes at least one aperture for aligning to an aperture of a rack panel of the removable rack apparatus.

18. The modular truck bed of claim 17, wherein each of the side panels flanges includes a plurality of apertures configured wherein a particular one of the plurality of apertures aligns with the removable rack panel aperture in accordance with a height of the removable rack apparatus relative to the truck bed floor.

19. The modular truck bed of claim 14, wherein the side panels include side skirts extending downward below a height of the truck bed floor to a clearance height.

* * * * *